(12) United States Patent
Okada et al.

(10) Patent No.: US 8,946,936 B2
(45) Date of Patent: Feb. 3, 2015

(54) ELECTROMAGNETIC COUPLING DEVICE, AND DOOR HANDLE AND VEHICLE DOOR HAVING ELECTROMAGNETIC COUPLING DEVICE

(75) Inventors: Hiroki Okada, Toyota (JP); Kiyokazu Ieda, Kariya (JP); Yuichi Murakami, Chiryu (JP)

(73) Assignees: Toyota Jidosha Kabushiki Kaisha, Toyota-shi (JP); Aisin Seiki Kabushiki Kaisha, Kariya-shi (JP)

( * ) Notice: Subject to any disclaimer, the term of this patent is extended or adjusted under 35 U.S.C. 154(b) by 1052 days.

(21) Appl. No.: 13/054,879

(22) PCT Filed: Jun. 11, 2009

(86) PCT No.: PCT/JP2009/060702
§ 371 (c)(1),
(2), (4) Date: Jan. 19, 2011

(87) PCT Pub. No.: WO2010/143292
PCT Pub. Date: Dec. 16, 2010

(65) Prior Publication Data
US 2011/0140479 A1 Jun. 16, 2011

(51) Int. Cl.
*H01F 27/42* (2006.01)
*H01F 37/00* (2006.01)
(Continued)

(52) U.S. Cl.
CPC .............. *E05B 81/78* (2013.01); *B60Q 1/2669* (2013.01); *E05B 85/16* (2013.01); *B60Q 2900/30* (2013.01); *E05B 2047/0056* (2013.01); *E05B 2047/0071* (2013.01)
USPC ........ 307/104; 307/9.1; 307/10.1; 296/146.1; 335/219

(58) Field of Classification Search
CPC ..... Y02T 10/7005; B60R 16/03; E05B 17/22; E05B 1/78; E05B 2047/0071; E05B 2047/0056; E05B 85/16; B60Q 1/2669; B60Q 2900/30; B60J 5/04
USPC ........ 307/9, 10.1, 104, 9.1; 296/146; 335/219
See application file for complete search history.

(56) References Cited

U.S. PATENT DOCUMENTS

| 5,712,552 A | 1/1998 | Hirai et al. |
| 6,218,933 B1 | 4/2001 | Josserand et al. |

(Continued)

FOREIGN PATENT DOCUMENTS

| JP | 7 100786 | 4/1995 |
| JP | 2000 225879 | 8/2000 |

(Continued)

OTHER PUBLICATIONS

International Search Report issued Sep. 2, 2009 in PCT/JP09/60702 filed Jun. 11, 2009.

(Continued)

*Primary Examiner* — Rexford Barnie
*Assistant Examiner* — Toan Vu
(74) *Attorney, Agent, or Firm* — Oblon, Spivak, McClelland, Maier & Neustadt, L.L.P.

(57) ABSTRACT

An electromagnetic coupling device electromagnetically connects a door handle side circuit of a door handle with a door main body side circuit of a door main body. This electromagnetic coupling device includes a door handle side coupling unit, a door main body side coupling unit, a door handle side coupling unit, a handle side support unit that supports the door handle, and a connector body that supports the door main body side coupling unit in a vehicle door main body. The door handle side coupling unit is electromagnetically coupled with the door main body side coupling unit without making contact therewith. At least one of the handle side support unit and the connector body restricts the relative movement, caused by rotation of the door handle, of the door handle side coupling unit and the door main body side coupling unit.

4 Claims, 4 Drawing Sheets

(51) Int. Cl.
*H01F 38/00* (2006.01)
*E05B 81/78* (2014.01)
*B60Q 1/26* (2006.01)
*E05B 85/16* (2014.01)
*E05B 47/00* (2006.01)

(56) References Cited

U.S. PATENT DOCUMENTS

| | | | |
|---|---|---|---|
| 6,976,726 B2 * | 12/2005 | Hirota et al. | 296/146.1 |
| 2007/0216175 A1 | 9/2007 | Tanimoto et al. | |
| 2007/0228768 A1 | 10/2007 | Kobayashi | |
| 2007/0230201 A1 | 10/2007 | Oba et al. | |
| 2009/0305551 A1 | 12/2009 | Kameda | |

FOREIGN PATENT DOCUMENTS

| | | |
|---|---|---|
| JP | 2002 96657 | 4/2002 |
| JP | 2004 216981 | 8/2004 |
| JP | 2004 239008 | 8/2004 |
| JP | 2006 19215 | 1/2006 |
| JP | 2006 233714 | 9/2006 |
| JP | 2007 254993 | 10/2007 |
| JP | 2007 254995 | 10/2007 |
| JP | 2007 262832 | 10/2007 |

OTHER PUBLICATIONS

International Preliminary Report on Patentability and Written Opinion issued Jan. 17, 2012 in PCT/JP2009/060702.

* cited by examiner

ELECTROMAGNETIC COUPLING DEVICE, AND DOOR HANDLE AND VEHICLE DOOR HAVING ELECTROMAGNETIC COUPLING DEVICE

TECHNICAL FIELD

The present invention relates to a vehicle door. In particular, the present invention relates to a vehicle door having wiring that electromagnetically couples an electrical circuit disposed in a door handle and an electrical circuit disposed in a vehicle. Electromagnetic coupling includes at least one of electrical coupling and optical coupling.

BACKGROUND ART

A vehicle door smart key system (registered trademark) has become widespread in recent years. E.g., the following technique (Patent Document 1) has been proposed as this type of system. In this technique, when a door lock is released or locked by a door lock releasing signal or door lock locking signal emitted by a portable device (smart key), a light-emitting diode is lit for a predetermined period, informing a driver of the door lock status. Specifically, when the door lock is released, a red light-emitting diode embedded in a door handle having a transparent body is lit for a fixed period, and when the door lock is locked, a green light-emitting diode embedded in the door handle having the transparent body is lit for a fixed period. In this technique, power supply to the two-color light-emitting diodes is performed by magnetic coupling. Consequently the handle, does not become unsightly even if it consists of transparent material, and the waterproofing treatment needed when wiring is mounted becomes unnecessary.

PRIOR ART DOCUMENTS

Patent Documents

[Patent Document 1] JP2007-254993A

DISCLOSURE OF INVENTION

Problem to be Solved by the Invention

In a vehicle door smart key system, an antenna and sensor, which are part of a circuit, are usually mounted in a door handle, and a control circuit is usually mounted in a vehicle. In this type of configuration, signal transmission is needed between the door handle side circuit and a main circuit. However, insufficient study has been performed on realizing non-contact transmission of the signal between the door handle side circuit and the main circuit in the vehicle. Further, this type of problem is not restricted to the vehicle door smart key system, but is a widespread problem in signal transmission.

The present invention has been created to solve the above problem, and aims to teach a technique that realizes effective transmission between a door handle and a vehicle door.

Means to Solve the Problem

The present invention can present a technique exemplified as the following configurations and aspects.

A first configuration example teaches an electromagnetic coupling device electromagnetically connecting a door handle side circuit of a door handle mounted so as to be capable of rotating with respect to a vehicle door main body, and a door main body side circuit of the door main body. This electromagnetic coupling device comprises a door handle side coupling unit, a door main body side coupling unit, a handle side support unit, and a door side support unit. The door handle side coupling unit is electromagnetically connected with the door handle side circuit. The door main body side coupling unit is electromagnetically coupled with the door handle side coupling unit without making contact therewith, and is electromagnetically connected with the door main body side circuit. The handle side support unit supports the door handle side coupling unit in the door handle. The door side support unit supports the door main body side coupling unit in the door main body. At least one of the handle side support unit and the door side support unit restrict the relative movement, caused by rotation of the door handle, of the door handle side coupling unit and the door main body side coupling unit.

In the first configuration example, the door handle side circuit of the door handle and the door main body side circuit of the door main body are connected by non-contact electromagnetic coupling between the door handle side coupling unit and the door main body side coupling unit. In this electromagnetic coupling, at least one of the handle side support unit and the door side support unit restricts the relative movement, caused by rotation of the door handle, of the door handle side coupling unit and the door main body side coupling unit, and consequently a worsening of electromagnetic coupling caused by rotation of the door handle can be reduced. E.g., stable electromagnetic coupling using a small amount of power can thereby be realized.

Moreover, in the present specification, electromagnetic coupling is used in a broad sense, including coupling realized using electromagnetic waves, such as light or the mutual induction of coils. Further, the term "connect" above may be construed so as to include at least one of non-contact coupling, and contact coupling using wiring. The door handle side circuit and door main body side circuit include not only electronic circuits, but also optical circuits for transmitting light for light emission or light for communication. Further, the restriction of relative movement may be realized by configuring, e.g., a support unit having a moving mechanism such as a hinge to deform, or by resilient deformation (to be described). Further, the door main body side circuit is understood in a broad sense and, in the case where a circuit is mounted in a vehicle main body, also includes wiring connected with the circuit in the vehicle main body.

Further, a standardized technique, e.g. International Standard ISO/IEC 18092 (Information technology—Telecommunications and information exchange between systems—Near Field Communication—Interface and Protocol (NFCIP-1)) can be utilized as a non-contact communication system.

As a second configuration example, in the electromagnetic coupling device of the first configuration example, the door side support unit and the handle side support unit fit mutually together. In the present configuration, relative movement is restricted by resilient deformation of at least one of the door side support unit and the handle side support unit. If this is done, relatively complex movement of the door handle side coupling unit and the door main body side coupling unit, including translation movement and rotary movement, can easily be followed, and assembly at the time of manufacturing can also be made easier.

As a third configuration example, in the electromagnetic coupling device of the first or second configuration examples, the door main body comprises a door glass which can be raised and lowered with respect to the door main body. The electromagnetic coupling device further comprises a window outer side coupling unit and a window inner side coupling unit. The window outer side coupling unit is disposed at the same side as the door handle of the door glass, and is electromagnetically connected with the door main body side coupling unit. The window inner side coupling unit is disposed at the opposite side from the door handle of the door glass, and is electromagnetically connected with the door main body side circuit. The window outer side coupling unit and the window inner side coupling unit are disposed at opposing positions with the door glass interposed therebetween, and are electromagnetically coupled.

In the third configuration example, since non-contact electromagnetic coupling is performed by the window outer side coupling unit and the window inner side coupling unit which are disposed at opposing positions with the door glass which can be raised and lowered with respect to the door main body interposed therebetween, the routing (cable layout) of a signal transmission pathway between the door handle side circuit and the door main body side circuit no longer needs to avoid a movement range of the door glass. Long routing which avoids the movement range of the door glass can thereby be made unnecessary. Since the door glass typically has a dielectric constant significantly greater than that of air, the window outer side coupling unit and window inner side coupling unit, which are disposed at opposing positions with the door glass interposed therebetween, can realize stable electromagnetic coupling using a small amount of power.

Moreover, the present invention can be realized in various forms, e.g., as a door handle or vehicle door having an electromagnetic coupling device.

Effects of the Invention

The present invention can teach a technique that realizes effective transmission between a door handle and a vehicle door.

DESCRIPTION OF PREFERRED EMBODIMENTS

Preferred features of the present invention can be realized, e.g., by providing the following characteristics either singly or in combination.

(Feature 1) An intermediate connector manufactured by molding utilizes the door main body side coupling unit, window outer side coupling unit, optical transmission device, and wiring. Consequently, a configuration can be realized in which wiring and optical circuits in a pathway from the door handle to the door glass are not at all exposed, thus increasing reliability.

(Feature 2) The intermediate connector is molded from resilient material. A configuration can thereby easily be realized that follows complex movement, including translation movement and rotary movement, that is caused by rotation of the door handle.

(Feature 3) The intermediate connector is formed by using wiring to couple the door main body side coupling unit and window outer side coupling unit, which are electromagnetic induction coils, these being wound in the same direction and having virtually identical (co-axial or common) central axes. The two electromagnetic induction coils are thereby integrated and can function as a connector that couples using both contact and non-contact pathways.

(Feature 4) Optical communication utilizing optical coupling to transmit information between antennas is applied. Interception by a third party is thereby prevented, and confidentiality can be increased.

(Feature 5) Information processing of the smart key system, and light for light emission and light for communication, are realized using an optical circuit that utilizes the same pathway. A highly reliable mounting can thereby be realized easily, and fault diagnosis also becomes easier.

Below, in order to clearly explain the operation and effects of the present invention based on the above characteristics, the features of the embodiments of the present invention will be described in the following sequence.

A. Configuration of a vehicle door of the embodiment of the present invention.

B. Supplementary items to the configuration of the vehicle door of the embodiment of the present invention.

C. Variants.

A. Configuration of a Vehicle Door of the Embodiment of the Present Invention.

Figure 1:
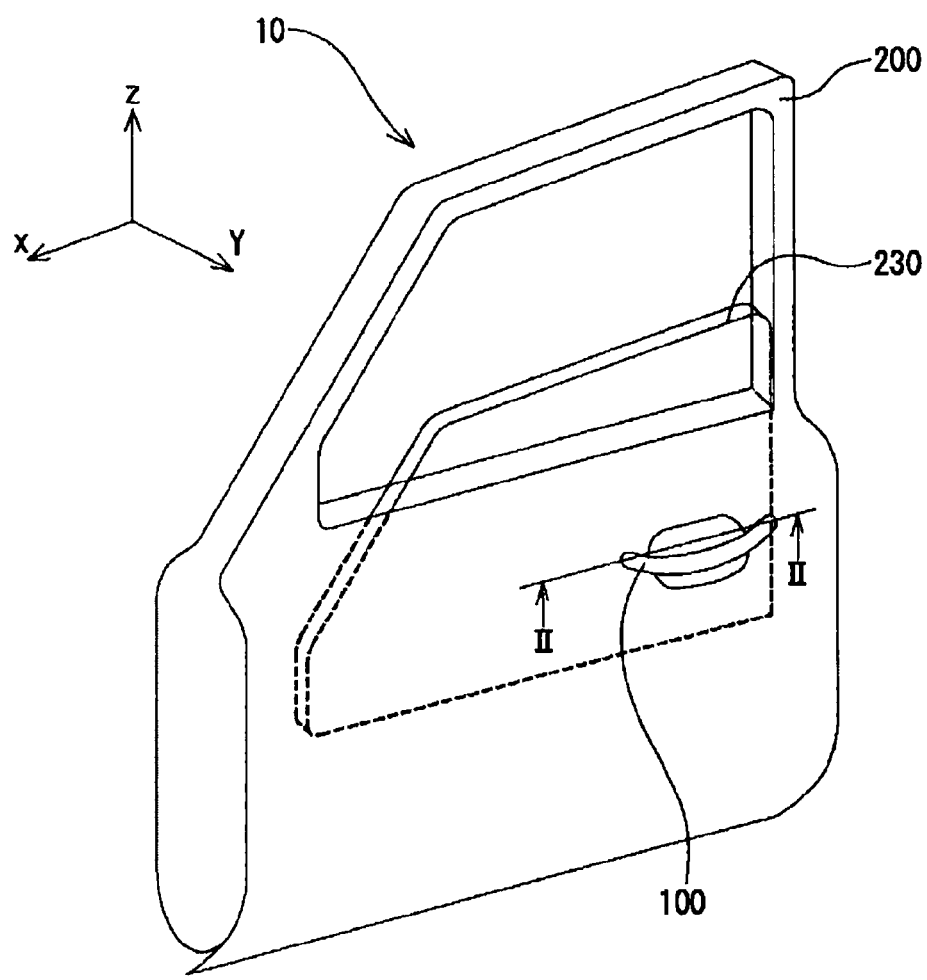
FIG. 1 is a perspective view showing a vehicle door 10 of an embodiment of the present invention.

FIG. 1 is a perspective view showing a vehicle door 10 of an embodiment of the present invention. The vehicle door 10 comprises a door handle 100 and a vehicle door main body 200 having a door glass 230. The door glass 230 is mounted such that it can move up and down (Z axis direction) with respect to the vehicle door 10. As will be described, the door handle 100 is mounted so as to rotate around the Z axis with a hinge unit 121 (see FIGS. 2 and 4), which is located to its anterior, as its center of rotation.

Figure 2:
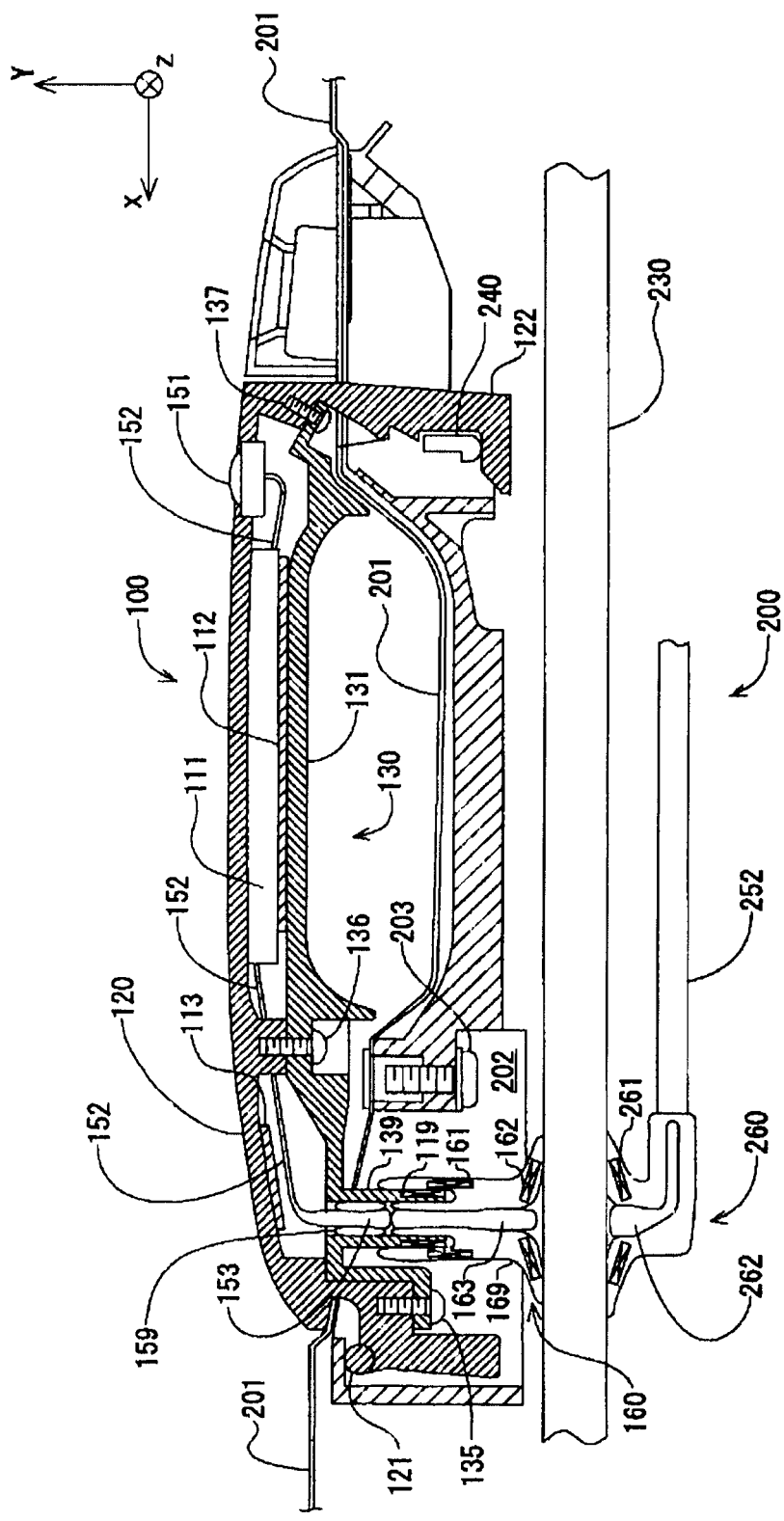
FIG. 2 is an enlarged cross-sectional view showing a cross-section in a location of a door handle 100 of the vehicle door 10 of the embodiment of the present invention.

FIG. 2 is an enlarged cross-sectional view showing a cross-section in a location of the door handle 100 of the vehicle door 10 of the embodiment of the present invention. FIG. 2 is an enlarged cross-sectional view viewed along the line II-II of FIG. 1. The door handle 100 comprises an outer handle member 120 and an inner handle member 130. The outer handle member 120 has the hinge unit 121 which is attached rotatably with respect to the vehicle door main body 200, and a door opening and closing mechanism operation unit 122 which operates a door opening and closing mechanism lever 240 in a Y axis direction. A grip unit 131, for a driver to hold on to, and a protruding handle side support unit 139, are formed on the inner handle member 130. The inner handle member 130 is screwed to the outer handle member 120 by three screws 135, 136, 137.

A mounted state of electronic components, etc. (including an optical circuit) on the door handle 100 is as follows. The outer handle member 120 comprises an antenna 111, a door unlocking detection device 112, a door locking detection device 113, an optical device 151, and an optical fiber 152. The antenna 111, the door unlocking detection device 112, and the door locking detection device 113 are connected by wiring (not shown) in an interface circuit (to be described). The door handle side coupling unit 119, which is an inductive coupling coil, and an optical transmission device 153, are attached to the handle side support unit 139 of the inner handle member 130. The optical transmission device 153 is attached to the handle side support unit 139 via a resilient member 159. Moreover, in the present figure, a cross-section of the antenna 111 is shown, but hatching is omitted so as not to complicate the figure.

The inductive coupling coils are coils for performing communication or supply of power using an electromagnetic induction system utilizing mutual induction of the coils by means of an AC magnetic field. Although non-contact communication has not just the electromagnetic induction system but also the radio wave system, the electromagnetic induction system has the advantages of strong magnetic coupling and excellent noise resistance and information confidentiality. In this type of electromagnetic induction system, since coupling strength is determined by how much lines of magnetic force generated by one of the inductive coupling coils are interlinked with the other of the inductive coupling coils, the smaller the deviation in angle of the two inductive coupling coils in an axial direction, and the smaller the distance between the two inductive coils, the stronger the coupling, and the greater the ability to realize a connection with excellent noise resistance and confidentiality with low power consumption.

The vehicle door main body 200 comprises a metal outer panel 201, a support member 202, and the door opening and closing mechanism lever 240. The outer panel 201 is screwed to the support member 202 by a screw 203. The support member 202, further, is fixed so that the hinge unit 121 of the door handle 100 can rotate around the Z axis, and is fixed so that the door glass 230 can move up and down in the Z axis direction.

A mounted state of electronic components, etc. on the vehicle door main body 200 is as follows. The vehicle door main body 200 comprises an intermediate connector 160 located further to the vehicle outer side (a positive direction of the Y axis) than the door glass 230, a main body side connector 260 located further to the vehicle inner side (a negative direction of the Y axis) than the door glass 230, and a harness 252. The main body side connector 260 has a window inner side coupling unit 261, which is an inductive coupling coil, and an optical transmission device 262. The harness 252 has optical fiber and electrical wiring (not shown). The main body side connector 260 has flocking on its tip at the door glass 230 side.

The configuration of the intermediate connector 160 is as follows. The intermediate connector 160 is a connector manufactured by molding (integrally molding), from a resilient material, a door main body side coupling unit 161 and a window outer side coupling unit 162, these being inductive coupling coils, an optical transmission device 163, and wiring (not shown). The molding is performed utilizing the resilient materials elastomer or polypropylene resin, thereby forming a connector body 169. The door main body side coupling unit 161 and the window outer side coupling unit 162 are both inductive coupling coils for performing communication and supply of power utilizing mutual induction of the coils by means of an AC magnetic field.

The door main body side coupling unit 161, and the window outer side coupling unit 162 are formed as inductive coupling coils by being wound in the same direction around the Y axis in the intermediate connector 160, and have virtually identical (co-axial or common) central axes. The door main body side coupling unit 161 and the window outer side coupling unit 162 are electrically connected by wires. The two electromagnetic induction coils are thereby integrated and can function as a connector that couples on both contact and non-contact pathways. The intermediate connector 160 further comprises the optical transmission device 163, which is located at a central axis side shaded by the connector body 169. In the present embodiment, the intermediate connector 160 has flocking on its tip at the door glass 230 side.

The mounted state of the intermediate connector 160 is as follows. The intermediate connector 160 is fixed to the support member 202 of the vehicle door main body 200. By fitting the protruding (a convex unit) handle side support unit 139 with a concave unit embedded in the door main body side coupling unit 161, the intermediate connector 160 can realize electromagnetic induction coupling of the door handle side coupling unit 119 and the door main body side coupling unit 161, and optical coupling of the optical transmission device 153 and the optical transmission device 163. In the operation of incorporating the door handle 100 into the vehicle door main body 200, a manual operation such as a mechanical connection utilizing a fitting mechanism (screw or latch) of a contact type connector thereby becomes unnecessary, and electromagnetic coupling can be realized easily. Moreover, the above concave-convex relationship may be reversed.

Thus, in the present embodiment, non-contact type coupling between the door handle side coupling unit 119 and the door main body side coupling unit 161 can be realized by fitting the handle side support unit 139 with the intermediate connector 160. It thereby becomes possible to connect a wire harness without performing a high precision operation that requires a connector connection or a rotation operation, and consequently this also has the advantage of promoting manufacturing automation, allowing productivity to be increased. Further, since the wired connector assembly is replaced by the simple intermediate connector 160, the component count is reduced and weight is also reduced. Moreover, in the present embodiment, the handle side support unit 139 and the connector body 169 are equivalent respectively to the "handle side support unit" and the "door side support unit" in the claims.

The intermediate connector 160 is electromagnetically coupled with the main body side connector 260, without making contact, in the following manner. The intermediate connector 160 has the window outer side coupling unit 162 that is an inductive coupling coil that is disposed virtually co-axially with the main body side connector 260, in a position facing the main body side connector 260 with the door glass 230 interposed therebetween. The window outer side coupling unit 162 and the window inner side coupling unit 261 can thereby perform communication and supply of power utilizing mutual induction of the coils. Since the optical transmission device 262 and the optical transmission device 163 are disposed virtually co-axially at facing positions with the door glass 230 interposed therebetween, optical coupling is realized.

The wiring path and optical path thereby no longer need long routing to avoid the movement range of the door glass 230. Since the optical transmission device 262 and the optical transmission device 163 can realize optical coupling with the door glass 230 therebetween, crack detection of the door glass 230 can also be performed. Further, in the vehicle door 10 of the driver's seat in which the smart key system is mounted, the door glass 230 requires high visible light transmittivity. Consequently, the problem of light attenuation caused by shading the door glass does not occur in optical coupling between the optical transmission device 262 and the optical transmission device 163. Since the door glass 230 typically has a dielectric constant significantly greater than that of air, this also has the advantage that stable electromagnetic coupling can be realized without making contact using a small amount of power.

Figure 3:
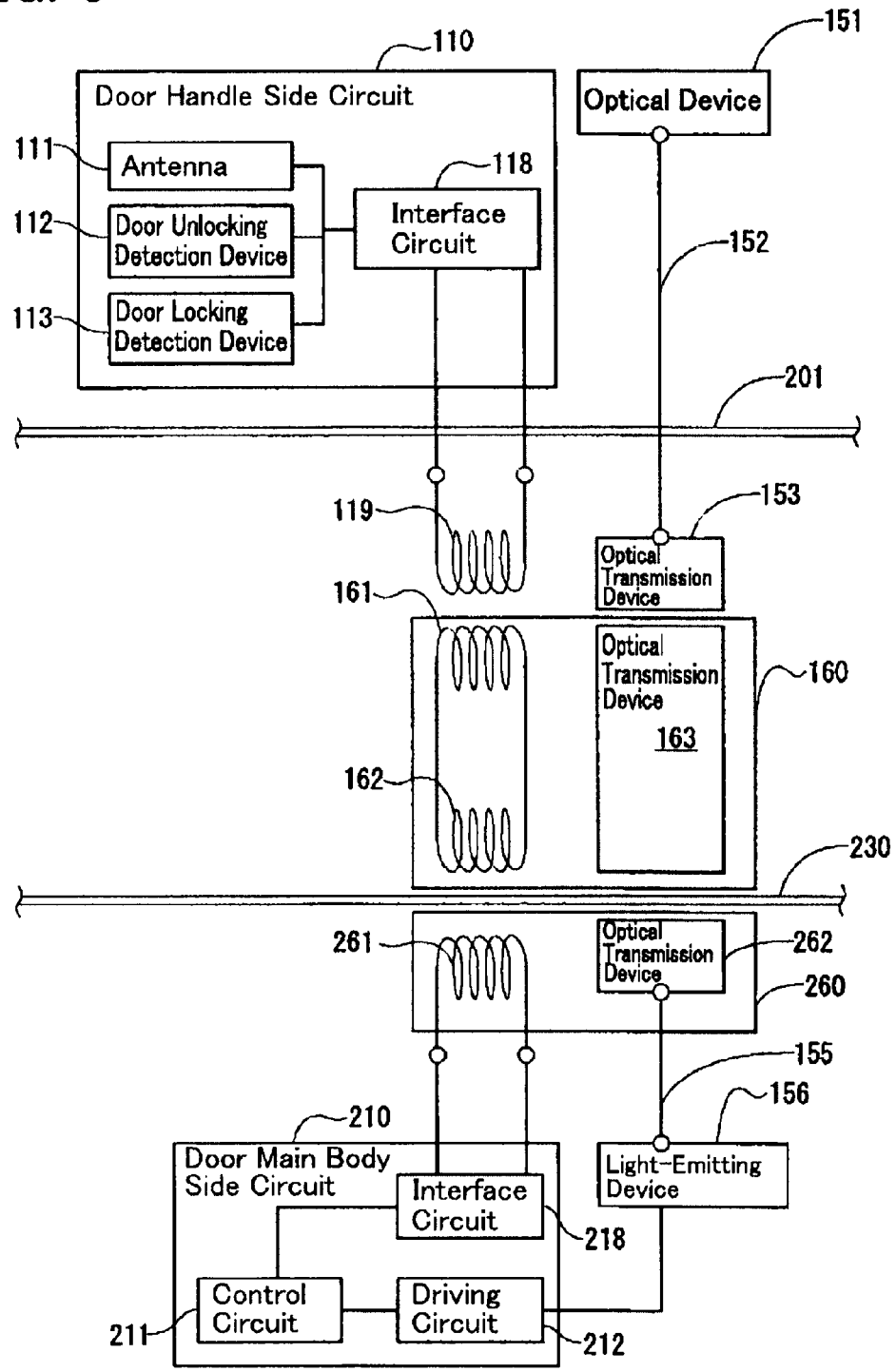
FIG. 3 shows a block diagram of optical equipment and electrical equipment mounted in the vehicle door 10 of the embodiment of the present invention.

FIG. 3 shows a block diagram of optical equipment and electrical equipment mounted in the vehicle door 10 of the embodiment of the present invention. The optical equipment comprises the optical device, 151, two optical fibers 152, 155, the three optical transmission devices 153, 163, 262, and a light-emitting device 156. The light-emitting device 156 changes emission color or flashing state in accordance with a door state (locked or unlocked, abnormal, etc.). The light of the light-emitting device 156 reaches the optical device 151 via, in sequence, the optical fiber 155, the optical transmission device 262, the optical transmission device 163, the optical transmission device 153, and the optical fiber 152. The optical device 151 diffuses the light which has reached it, emitting it to the exterior. The driver can thus ascertain the door state (e.g., the locked or unlocked state of the lock).

The connecting state of the optical equipment and electrical equipment in the vehicle door 10 is as follows. A door handle side circuit 110 is connected by wiring to the door handle side coupling unit 119. The door handle side coupling unit 119 is connected (coupled) by electromagnetic induction coupling with the door main body side coupling unit 161 of the intermediate connector 160. The window outer side coupling unit 162 of the intermediate connector 160 faces the window inner side coupling unit 261 with the door glass 230 interposed therebetween, and is connected (coupled) by electromagnetic induction coupling with the window inner side coupling unit 261. The window inner side coupling unit 261 is connected by wiring to a door main body side circuit 210.

The optical device 151 is connected by the optical fiber 152 with the optical transmission device 153. The optical transmission device 153 is connected (coupled) by optical coupling with the optical transmission device 163 of the intermediate connector 160. The optical transmission device 163 is connected (coupled) by optical coupling with the optical transmission device 262 via the door glass 230. The optical transmission device 262 is connected by the optical fiber 155 with the light-emitting device 156.

The door handle side circuit 110 comprises the antenna 111, the door unlocking detection device 112, the door locking detection device 113, and an interface circuit 118. The antenna 111 is capable of receiving and sending encrypted signals in the smart entry system. The door unlocking detection device 112 is capable of detecting electrostatic capacity between the door unlocking detection device 112 and the outer panel 201 near the grip unit 131. The door locking detection device 113 is capable of detecting electrostatic capacity between the door locking detection device 113 and the outer panel 201 at the front of the door handle 100 away from the grip unit 131.

The interface circuit 118 of the door handle side circuit 110 is electrically connected with an interface circuit 218 of the door main body side circuit 210 utilizing the aforementioned electromagnetic induction coupling. In the present embodiment, the two interface circuits 118, 218 function as a modulation circuit and a demodulation circuit, and are connected by electromagnetic induction coupling utilizing the mutual induction of coils by means of an AC magnetic field. Communication between the door handle side circuit 110 and the door main body side circuit 210, and power supply from the door main body side circuit 210 to the door handle side circuit 110 thereby becomes possible, and the vehicle door 10 can thus perform the following operations.

Utilizing the above connection, the vehicle door 10 can realize the following operations.

(1) A control circuit 211 automatically starts wireless verification as a driver having a smart key (not shown) approaches the door handle 100, and allows the door lock to be released upon ending verification. This wireless verification is performed using the antenna 111 of the door handle 100.

(2) In the case where the release of the door lock is allowed, the control circuit 211 releases the door lock in accordance with change in electrostatic capacity between the door unlocking detection device 112 and the outer panel 201 upon the driver making contact with the grip unit 131.

(3) The control circuit 211 locks the door lock in accordance with change in electrostatic capacity between the door locking detection device 113 and the outer panel 201 upon the driver making contact with the front part of the door handle 100.

(4) In accordance with the aforementioned states, the control circuit 211 operates a driving circuit 212 to operate an outputting state of the light-emitting device 156, and controls a light-emitting state of the optical device 151.

Figure 4:
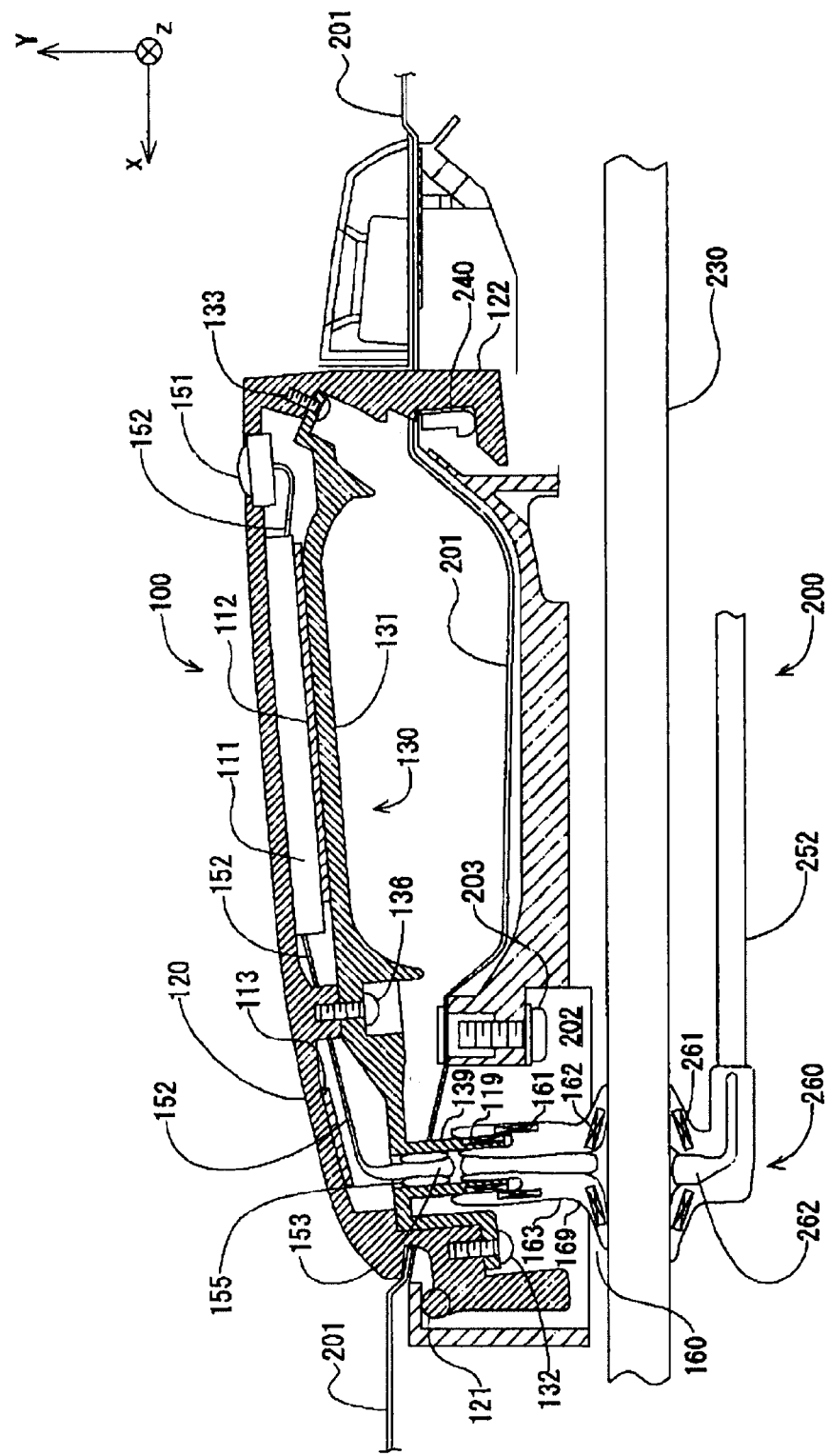
FIG. 4 is an enlarged cross-sectional view showing a cross-section of the door handle 100 of the vehicle door 10 of the embodiment of the present invention in a rotated state.

FIG. 4 is an enlarged cross-sectional view showing a cross-section of the door handle 100, in a rotated state, of the vehicle door 10 of the embodiment of the present invention. In accordance with a manual operation by the driver, the door handle 100 rotates around the Z axis with respect to the vehicle door main body 200, with the hinge unit 121 attached to the vehicle door main body 200 as its center. As the door handle 100 rotates around the Z axis, the door handle 100 moves the door opening and closing mechanism operation unit 122 in the Y axis direction with respect to the vehicle door main body 200, operating the door opening and closing mechanism lever 240. In accordance with this operation, the door opening and closing mechanism lever 240 can manually open and close the vehicle door 10 while it is in the unlocked state.

Assuming no resilient deformation of the connector body 169, the door handle side coupling unit 119 generates relative translation movement and relative rotary movement in a direction of mutual separation with respect to the door main body side coupling unit 161 of the vehicle door main body 200. This is because, in accordance with the aforementioned rotation operation, the door handle side coupling unit 119 performs the rotation operation around the Z axis and the translation movement operation in the Y axis direction. Of these types of relative movement, the rotary movement is minute since there is typically a long distance between the hinge unit 121 and the grip unit 131 of the door handle 100. Since the location of the door main body side coupling unit 161 is closer to the hinge unit 121 than to the grip unit 131, the translation movement can also be made smaller than the operation amount of the grip unit 131.

As is clear from FIG. 4, this type of minute relative movement between the door handle side coupling unit 119 and the door main body side coupling unit 161 can be absorbed adequately by the intermediate connector 160 following the movement of the door handle side coupling unit 119, wherein the connector body 169 of the intermediate connector 160 deforms resiliently. I.e., despite the rotation of the door handle 100, a positional relationship of the door handle side coupling unit 119 and the door main body side coupling unit 161 sufficient for electromagnetic coupling can be maintained by the connector body 169 deforming resiliently. In particular, in the present embodiment, since the amount of deviation (angle) in the axial direction and the distance of the two inductive coupling coils 119, 161 can both be kept small, diminishment of the mutually interlinking lines of magnetic force can be reduced significantly. The notable effect is thereby achieved of being able to maintain strong electromagnetic induction coupling.

Thus, in the present embodiment, non-contact communication and optical coupling between the door handle side circuit 110 and the door main body side circuit 210 can be maintained despite the rotation operation of the door handle 100. By contrast, in the case of a wired connection, the connection of the wire harness between movable components causes the following problems: bending or movement of the wire harness accompanying movability of the components, friction, chatter during vibration, resonance, and the load of a waterproofing process.

Thus, as in the case of the door handle 100 and the vehicle door main body 200, the mutual induction of coils is utilized in the present embodiment for electromagnetic induction coupling to perform communication and supply of power between movable components which have complex and minute relative movement that includes rotary movement and translation movement. This successfully creates a notable effect which could not be foreseen by persons skilled in the field at the time of application.

Further, since this type of non-contact communication can provide design flexibility whereby electrically contacting parts can be completely eliminated, the decrease in reliablity or increase in manufacturing cost that accompanies poor contact in connecting conventional contact type electrical connectors can be suppressed. This is a notable effect particularly because, as described above, the operation of movable parts readily creates poor contact.

Further, in the present embodiment, since a plurality of signals can be conveyed using a single carrier, the amount of wiring does not need to be increased even if the type of signals received and transmitted increase, thus realizing a communication-energy supply pathway having a high degree of design flexibility and design compatibility. Further, since the production process can be simplified, as described above, this paves the way for automating the assembly process of the door handle 100.

B. Supplementary Items to the Configuration of the Vehicle Door of the Embodiment of the Present Invention.

Below, a supplementary description is given for the vehicle door 10 of the embodiment. As shown in the embodiment, the door handle side circuit 110 is typically an electronic circuit for locking. The door main body side circuit 210 is a main circuit that, in conjuction with the door handle side circuit 110, controls the locking of the door. The door main body side circuit 210 may be mounted within the vehicle body. In that sense, the door main body side circuit 210 may be termed, in other words, a "main circuit within the vehicle body."

The door handle side coupling unit 119 and the door main body side coupling unit 161 are both devices that have coils and that transmit electrical signals while remaining electrically insulated. The door handle side coupling unit 119 and the door main body side coupling unit 161 may, in other words, together be termed "a pair of magnetic couplers." If one of the door handle side coupling unit 119 and the door main body side coupling unit 161 represents a first coil and the other thereof represents a second coil, the pair of magnetic couplers consist of the first coil and the second coil, and may be termed, in other words, a device that transmits signals between the door handle side circuit and the main circuit within the vehicle body. Further, the first coil and the second coil are disposed opposite one another.

The connector body 169 is formed by the resilient member. One end of the connector body 169 joins with the door handle 100, and the other end thereof joins with the door main body 200.

Using the different expressions above, the characteristics of the vehicle door 10 of the embodiment can be expressed as follows. The vehicle door 10 comprises the door main body 200, the door handle 100, the pair of magnetic couplers, and the resilient member 169. The door handle 100 is supported rotatably with respect to the door main body 200, and is attached to the door handle side circuit 110 used for electronic locking. The pair of magnetic couplers consist of the first coil 119 and the second coil 161, and transmit signals between the door handle side circuit 110 and the main circuit 210 within the vehicle body. One end of the resilient member (the connector body 169) joins with the door handle 100, the other end thereof joins with the door main body 200, and the resilient member deforms as the door handle 100 rotates. At least one of the first coil 119 and the second coil 161 is attached to the resilient member, and the other of the first coil 119 and the second coil 161 is attached so as to be opposite that coil. Specifically, the second coil 161 is attached to the resilient member, and the first coil 119 is attached to the door handle 100 at a position opposite the second coil. According to the above configuration, the resilient member restricts relative positional divergence, caused by rotation of the door handle, of the pair of magnetic couplers.

The advantages of the vehicle door 10 of the embodiment will be reiterated. The door handle side circuit and the main circuit can be connected by a cable. However, with a flexible cable, the cable repeatedly deforms as the door handle is rotated, and consequently deteriorates over time. Mounting a radio wave transceiver in the door handle and the door main body increases costs. Magnetic couplers utilizing coils are low cost and, since they are non-contact, do not undergo the repeated deformation that the cable undergoes due to rotation. Unlike connectors that make physical contact between terminals, magnetic couplers are able to transmit electrical signals even if their relative positions diverge slightly. However, signal transmission efficiency falls if the pair of magnetic couplers have a large positional divergence. The vehicle door 10 utilizes magnetic couplers capable of transmitting signals without their relative position being fixed, and restricts the relative positional divergence, caused by rotation of the door handle, of the pair of magnetic couplers. Consequently, low output magnetic couplers can be adopted in the configuration of the vehicle door of the embodiment.

The door handle 100 of the embodiment comprises the handle side support unit 139 that supports the first coil 119. The handle side support unit 139 is equivalent to a protrusion extending in the rotation direction of the door handle 100. The protrusion fits together with the resilient member (the connector body 169), such that it can slide in the rotation direction. The first coil 119 and the second coil 161 of the pair of magnetic couplers are disposed in opposing positions co-axially with the protrusion and the resilient member respectively.

By providing a configuration where the protrusion (the handle side support unit 139) and the resilient member (the connector body 169) fit together along the rotation direction of the door handle 100, the protrusion and the resilient member fit together simultaneously with attaching the door handle 100. By providing the above configuration, the assembly of the door handle 100, this including the establishment of the signal transmission pathway, can be performed easily.

The vehicle door 10 of the embodiment further comprises a third coil (the window outer side coupling unit 162) and a fourth coil (the window inner side coupling unit 261), and comprises a pair of second magnetic couplers that are directly connected with the aforementioned pair of magnetic couplers and that transmit signals, together with the aforementioned pair of magnetic couplers, between the door handle side circuit and the main circuit. The third coil and the fourth coil are disposed at opposing positions with the door glass 230 interposed therebetween. The advantage of the second magnetic couplers is the same as that described above.

The door handle 100 comprises the optical device 151 that radiates light to the exterior. The vehicle door 10 of the embodiment comprises the pair of optocouplers 153, 160 that transmit, to the optical device 151, the light emitted by the light-emitting device 156 provided in the vehicle body. The pair of optocouplers are disposed co-axially with the protrusion (the handle side support unit 139) at the inner side of the magnetic couplers and the resilient member (the connector body 169) respectively.

C. Variants.

A specific example of the present invention is described above in detail, but this example is merely illustrative and places no limitation on the scope of the patent claims. The technology described in the patent claims also encompasses various changes and modifications to the specific example described above. The technical elements explained in the present specification and drawings provide technical utility either independently or through various combinations. The present invention is not limited to the combinations described at the time the claims are filed. Further, the purpose of the examples illustrated by the present specification and drawings is to satisfy multiple objectives simultaneously, and satisfying any one of those objectives gives technical utility to the present invention. Specifically, e.g., the following type of variants can also be embodied. Moreover, the novel technique taught in the present specification can also be utilized in connection of vehicle components other than a vehicle door.

C-1: In the above embodiment, both electrical coupling and optical coupling between the door handle and the vehicle door main body are realized. However, only electrical coupling may be realized, only optical coupling may be realized or, as in the embodiment, both couplings may be realized. The coupling that can be utilized in the present invention may be general non-contact electromagnetic coupling. However, if optical communication using optical coupling in communication between the antenna 111 and the circuit in the vehicle is applied, this has the advantage of preventing interception by a third party, increasing confidentiality. Further, if all the coupling is configured using optical circuits, it is possible to e.g., send indicator light for notifying the driver about the door lock state along the same pathway as the light for communication. Consequently, simple mounting can be realized.

C-2: In the above embodiment and variant, two electromagnetic couplings are provided: coupling between the door handle and the vehicle door main body, and coupling across the door glass at the interior of the vehicle door main body. However, e.g., only one of these couplings, or 3 or more couplings may be provided. However, in the case where the connection between the door handle and the vehicle door main body is realized by a single electromagnetic coupling, it is preferred that this coupling is across the door glass. This has the advantages of making long routing to avoid the movement range of the door glass unnecessary, and allowing crack detection of the door glass utilizing optical coupling.

C-3: In the above embodiment and variants, although the intermediate connector is utilized that is manufactured by molding resilient material into the door main body side coupling unit, window outer side coupling unit, optical transmission device, and wiring, the intermediate connector need not necessarily be used. However, using the intermediate connector has the advantage of providing a communication pathway, from the door handle at a vehicle inner side of the door glass, this being configured such that wiring and optical circuits are not at all exposed in the pathway from the door handle to the door glass. Further, since the intermediate connector is molded from resilient material, a configuration can easily be realized that follows complex movement, including translation movement and rotary movement, of the door handle side coupling unit, this being caused by rotation of the door handle.

Further, there is also the advantage that, even if the wiring route changes due to design changes of the door main body side, corresponding design changes of the intermediate connector can be made without performing design changes of the door handle. This has the advantage of also being easily applicable to other types of vehicle.

C-4: In the above embodiment and variants, the door handle side circuit is a circuit for realizing the function of a smart key system. However, the door handle side circuit may, e.g., also simultaneously realize other functions, or may realize a function other than the smart key system. The door handle side circuit may exchange at least one of signals or energy (electrical or optical energy) with the door main body side circuit of the door main body.

C-5: In the above embodiment and variants, the door main body side coupling unit (the connector body 169 in the embodiment) moves following other movement, restricting the relative movement of the door main body side coupling unit and the door handle side coupling unit. However, a configuration may be adopted in which e.g., resilient deformation occurs at the side of the handle side support unit 139 that supports the door handle side coupling unit, or in which resilient deformation occurs at both sides. Further, deformation may be not only resilient deformation, but may be realized by e.g., providing a mechanism such as a link mechanism. Further, it is not necessary to diminish both relative rotary movement and relative translation movement, as described above, but instead only one thereof may be diminished. The support configuration that can be used in the present invention may generally thus be configured such that at least one of the handle side support unit and the door side support unit restricts relative movement, caused by rotation of the door handle, of the door handle side coupling unit and the door main body side coupling unit.

EXPLANATION OF THE NUMBERS

10 . . . vehicle door
24 . . . door opening and closing mechanism lever
100 . . . door handle
110 . . . door handle side circuit
111 . . . antenna
112 . . . door unlocking detection device
113 . . . door locking detection device
118 . . . interface circuit
119 . . . door handle side coupling unit
120 . . . outer handle member
121 . . . hinge unit
122 . . . door opening and closing mechanism operation unit
130 . . . inner handle member
131 . . . grip unit
135 . . . screw
139 . . . handle side support unit
151 . . . optical device
152, 155 . . . optical fiber
153, 163 . . . optical transmission device
156 . . . light-emitting device
159 . . . resilient member
160 . . . intermediate connector 161 ... door main body side coupling unit
162 ... window outer side coupling unit
169 ... connector body
200 ... vehicle door main body
201 ... outer panel
202 ... support member
203 ... screw
210 ... door main body side circuit
211 ... control circuit
212 ... driving circuit
218 ... interface circuit
230 ... door glass
240 ... door opening and closing mechanism lever
252 ... harness
260 ... main body side connector
261 ... window inner side coupling unit
262 ... optical transmission device

The invention claimed is:

1. An electromagnetic coupling device electromagnetically connecting a door handle side circuit adapted to be provided in a door handle which is so mounted to a vehicle door main body as to rotate relative thereto and a door main body side circuit adapted to be provided in the vehicle door main body, the door main body including a door glass which can be raised and lowered with respect to the door main body, the electromagnetic coupling device comprising:

a door handle side coupling unit electromagnetically connected with the door handle side circuit;
a door main body side coupling unit electromagnetically coupled with the door handle side coupling unit without making contact therewith;
a handle side support unit that supports the door handle side coupling unit in the door handle;
a door side support unit that supports the door main body side coupling unit in the door main body;
a window outer side coupling unit disposed at the same side of the door glass as the door handle, and electromagnetically connected with the door main body side coupling unit; and
a window inner side coupling unit disposed at the opposite side of the door glass from the door handle, and electromagnetically connected with the door main body side circuit,
wherein at least one of the handle side support unit and the door side support unit restricts the relative movement, caused by rotation of the door handle, of the door handle side coupling unit and the door main body side coupling unit, and
wherein the window outer side coupling unit and the window inner side coupling unit are disposed at opposing positions with the door glass interposed therebetween, and are electromagnetically coupled.

2. The electromagnetic coupling device according to claim 1, wherein
the door side support unit and the handle side support unit fit mutually together, and
the relative movement is restricted by resilient deformation of at least one of the door side support unit and the handle side support unit.

3. The electromagnetic coupling device according to claim 1 or 2, wherein, the electromagnetic coupling includes coupling by means of radio waves and coupling by means of light.

4. A vehicle door comprising:
a vehicle door main body;
a door glass which can be raised and lowered with respect to the door main body; and
a door handle mounted so as to rotate with respect to the vehicle door main body,
wherein the vehicle door main body includes
a door main body side circuit,
a door main body side coupling unit,
a door side support unit that supports the door main body side coupling unit,
a window outer side coupling unit disposed at the same side of the door glass as the door handle, and electromagnetically connected with the door main body side coupling unit, and
a window inner side coupling unit disposed at the opposite side of the door glass from the door handle, and electromagnetically connected with the door main body side circuit,
wherein the door handle includes
a door handle side circuit,
a door handle side coupling unit electromagnetically connected with the door main body side circuit without making contact therewith, and electromagnetically connected with the door handle side circuit, and
a handle side support unit that supports the door handle side coupling unit,
wherein at least one of the door side support unit and the handle side support unit restricts, by means of deformation, the relative movement, caused by rotation of the door handle, of the door handle side coupling unit and the door main body side coupling unit, and
wherein the window outer side coupling unit and the window inner side coupling unit are disposed at opposing positions with the door glass interposed therebetween, and are electromagnetically coupled.

* * * * *